F. A. PIERCE.
TRAIN RECORDING APPARATUS.
APPLICATION FILED MAR. 26, 1909.
995,634.
Patented June 20, 1911.
4 SHEETS—SHEET 1.
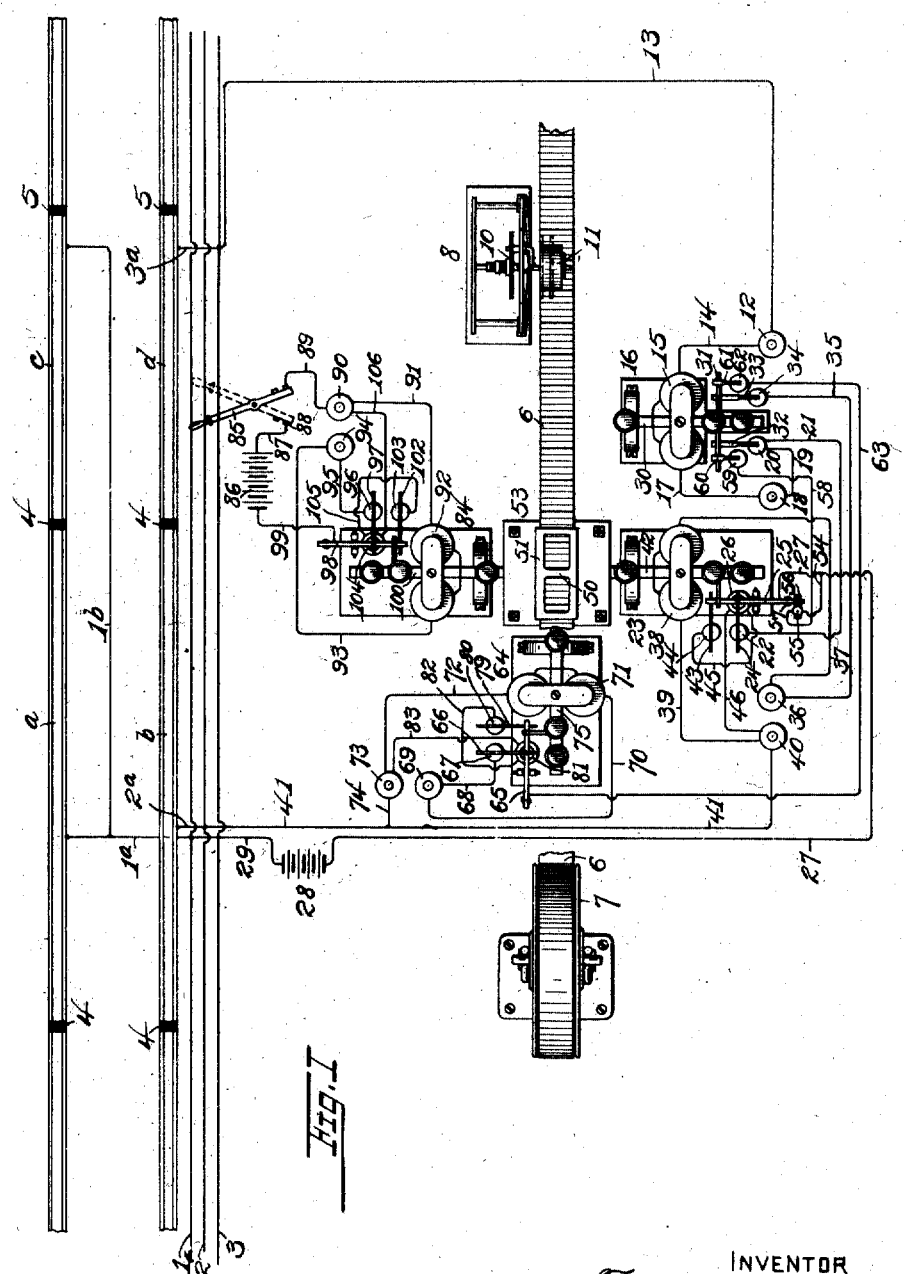
Fig. I.
WITNESSES:
INVENTOR
Franklin A. Pierce
BY
H. E. Dunlap
ATTORNEY.

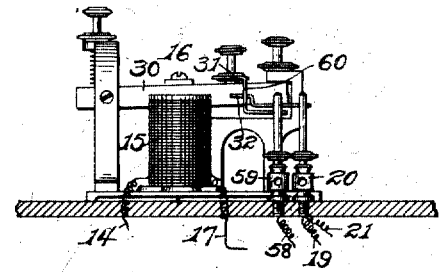
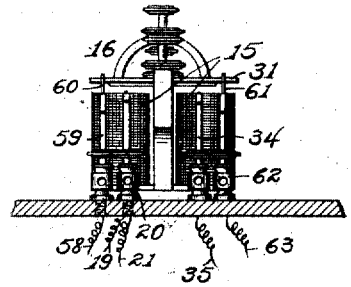
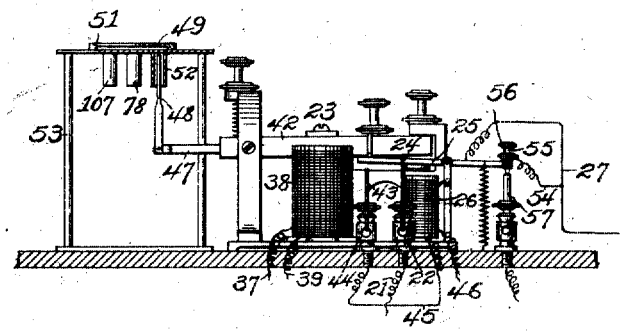
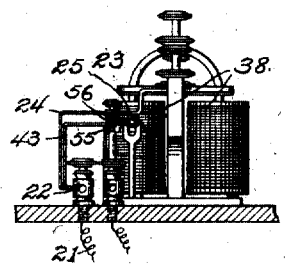
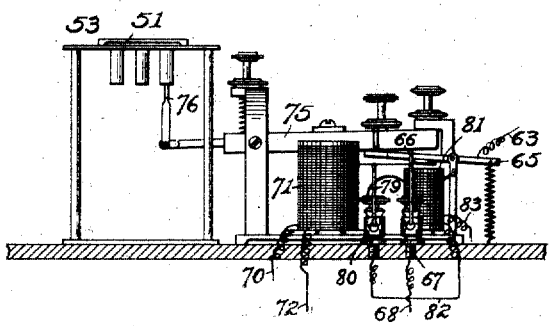

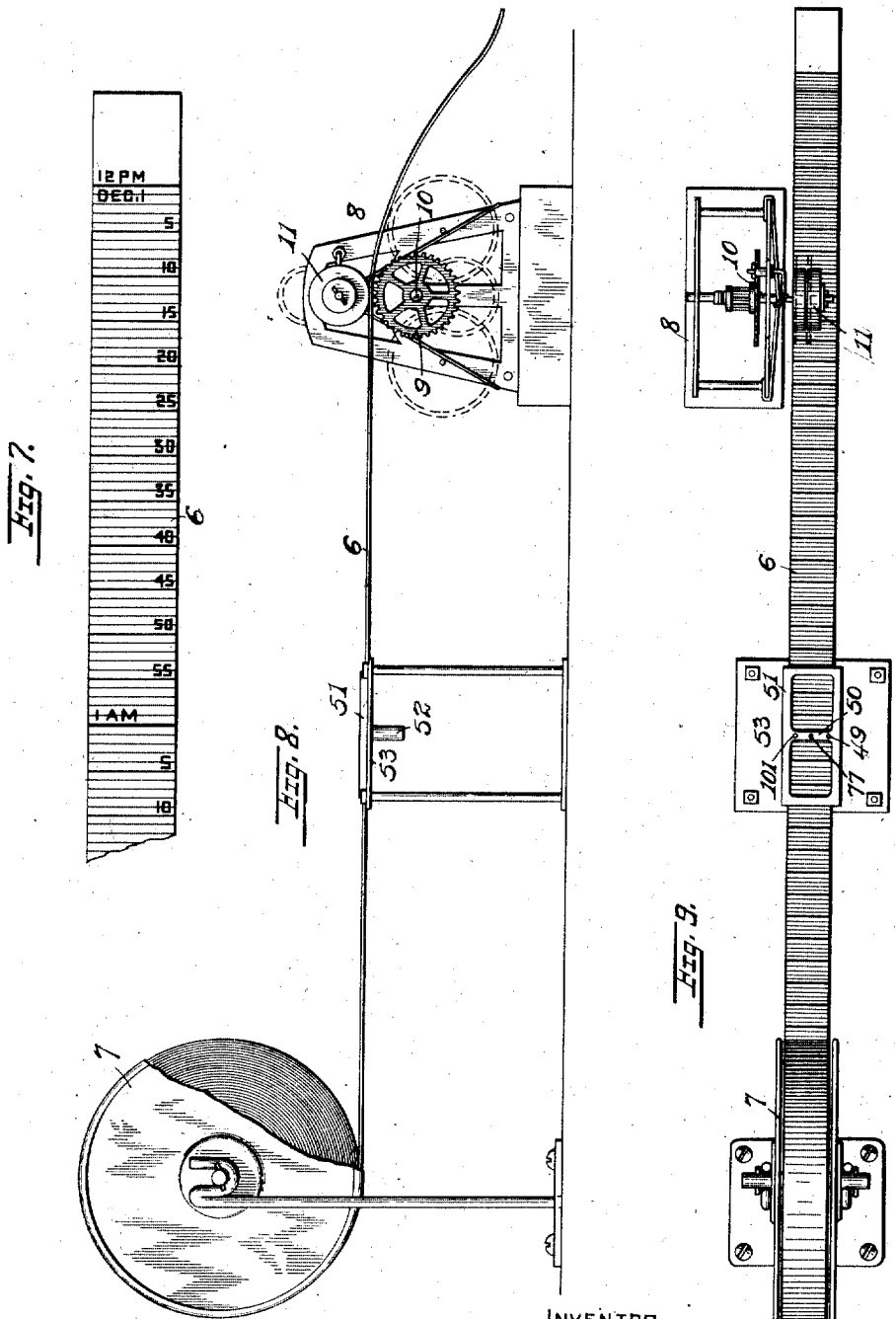

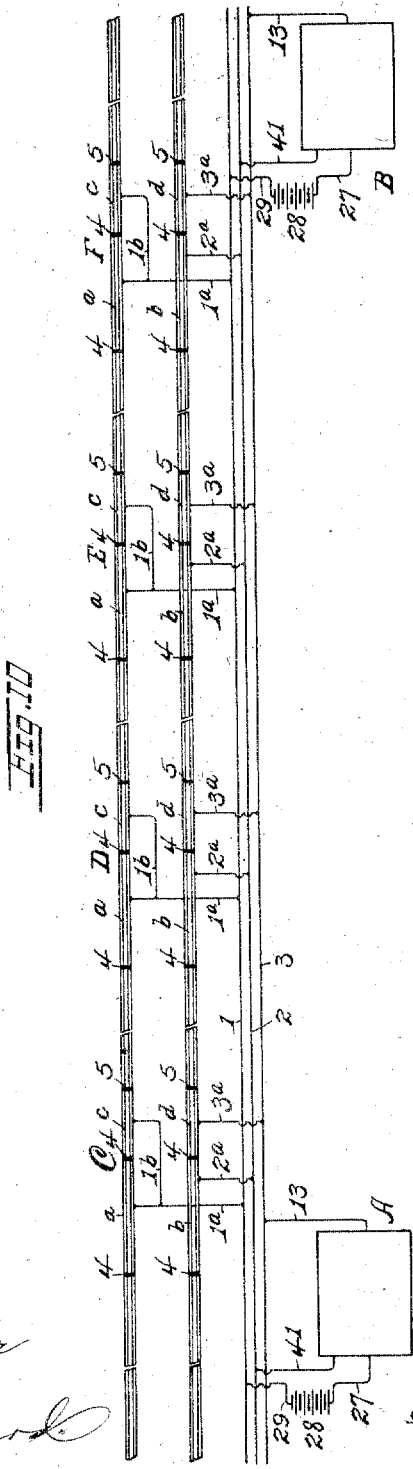

UNITED STATES PATENT OFFICE.

FRANKLIN A. PIERCE, OF WHEELING, WEST VIRGINIA.

TRAIN-RECORDING APPARATUS.

995,634.  Specification of Letters Patent.  Patented June 20, 1911.

Application filed March 26, 1909. Serial No. 485,983.

*To all whom it may concern:*

Be it known that I, FRANKLIN A. PIERCE, a citizen of the United States of America, and resident of Wheeling, county of Ohio, and State of West Virginia, have invented certain new and useful Improvements in Train-Recording Apparatus, of which the following is a specification.

This invention has relation to a train registering apparatus, and it has for its primary object to provide a system whereby each train in what is herein termed a "division" of a railway system automatically and accurately records and indicates at a given point, as, for instance, in a train despatcher's or operator's office the time of its arrival at, and the time of its departure from, stations along said division, and also, at the same time, indicates and records the direction in which it is traveling.

A further object of the invention is to provide a recording instrument and electrical connections therefor whereby the train-despatcher or operator will be accurately apprised of the time a train passes a given point on the division.

It is frequently desirable, particularly in the night time, to dispense with the services of telegraph-operators at small way-stations where their only duties are to report the arrival and departure of trains, and this invention contemplates the provision of means whereby the arrival and departure of trains at such way-stations will be automatically announced or recorded in the offices of stations where operators are continuously employed.

Suppose, for instance, that two stations are equipped with the instruments comprising part of this invention, and that a number of small stations intervene, the time of the arrival at and departure of trains from said intervening stations will be indicated by the instruments at the two equipped stations, thus rendering the employment of operators at such intervening stations unnecessary.

Other objects of the invention will be in part obvious and in part pointed out hereinafter.

The invention accordingly consists in the features of construction, combinations of elements and arrangement of parts and of wiring connections which will be exemplified in the construction hereinafter set forth, and the scope of the application of which will be indicated in the appended claims.

In the drawings—Figure 1 is a diagrammatic view of the recording instrument, showing its connection with the railway track; Fig. 2 is an enlarged side elevation of the circuit changer; Fig. 3 is an end view of the same; Fig. 4 is a side elevation of one of the perforating devices; Fig. 5 is an end view of the same; Fig. 6 is a side elevation of another perforating device; Fig. 7 is an enlarged fragmentary portion of the tape, the same being shown in top plan; Fig. 8 is a side elevation of the tape-reel, perforating stand and tape-moving mechanism; Fig. 9 is a top plan view of the same; and— Fig. 10 is a diagrammatic view, showing the manner of wiring the track.

Hitherto, in order to expeditiously and cautiously control or direct the movement of trains, it has been incumbent upon railway companies to maintain operators at all stations along the line of railway during the day, and at all but a very few small way-stations during the night, the chief duties of said operators being to report the arrival and departure of trains.

The purpose of the present invention is, as before stated, to provide positive automatic means whereby the time of the passage of trains by points along the line of railway will be indicated at other points along the line, thereby rendering it unnecessary to maintain operators at other than a comparatively few widely-separated stations along the line. To this end, the line of railway is divided into long blocks or divisions, each of which includes a number of stations, as, for instance, six, as shown in Fig. 10; and recording instruments forming a part of this invention are located in the offices of the stations at the extremities of the divisions, which instruments will accurately record the passage of trains by the intermediate stations.

Referring particularly to Fig. 10, the numerals 1, 2 and 3 indicate what may be termed "line wires", said wires connecting the two remote recording stations A and B, between which are located a plurality of non-recording stations C, D, E and F. At each of the non-recording stations a short length of track, preferably two or three track-rails in length, is insulated from the remainder of the track at both ends, as shown at points 4, and leading from wires 1 and 2 to the opposite track-rails *a* and *b* in said short length of track are branch wires 1ª and 2ª. Adjacent to said short length of track, and insulated from the remainder of the track at the end thereof remote from said short length, as shown at points 5, is a second short length of track, preferably but one track-rail in length, and leading from wire 3 to one of the track-rails *d* thereof is a branch wire 3ª, while a wire 1ᵇ tapped in on branch wire 1ª leads to the opposite rail *c*, as shown.

The recording instrument located at each of the recording stations A and B comprises a tape 6 wound upon an appropriately-mounted reel 7, a chronometer 8 having suitable tape carrying means, as, for instance, a wheel 9 mounted upon the arbor 10 and having a roller 11 coöperating therewith, for unwinding the tape from the reel at a fixed and uniform rate of speed, and electrically operated tape perforating mechanism, said mechanism being adapted to be automatically actuated by the entrance of a train upon one of the short lengths of track at any of the non-recording stations C, D, E and F.

The tape 6 is provided with graduations representing minutes and hours and bears the date and hours of the day printed thereon, and the chronometer in a given time reels off said tape in the distance represented thereon by such given time.

The tape perforating mechanism comprises a plurality of perforating instruments located adjacent to the path of travel of the tape 6 as it is unwound from the reel, and electrical actuating mechanism for said instruments, which mechanisms will now be described.

Connected to the line wire 3 and leading to a binding post 12 is a wire 13, and a wire 14 leads from said binding post to a pair of magnet coils 15 forming a part of a device 16, similar in construction to an ordinary telegraph sounder, herein termed a "circuit changer". A wire 17 leads from the said magnet coils 15 to a binding post 18 which is connected by wire 19 to a post 20 in said circuit changer. A wire 21 leads from said post 20 to a post 22 forming part of a tape perforator 23. A fixed member 24 carried by said post 22 overlies and is normally in contact with the pivotally-mounted armature 25 of a small magnet-coil 26 which also forms a part of said perforator 23. A wire 27 connected to said armature 25 leads to a battery 28 which is connected by a wire 29 to the wire 1.

From the foregoing it will be seen that when a train, in traveling from right to left along the track, passes upon the rails *c* and *d*, an electrical circuit is established through the front axle of the engine, said circuit including the battery 28, wires 29, 1, 1ª and 1ᵇ, rail *c*, the axle of the engine, rail *d*, wires 3ª, 3, 13 and 14, magnet coils 15, wires 17 and 19, contact post 20, wire 21, contact post 22, fixed member 24, armature 25 and wire 27. When said circuit is closed, energizing the magnet coils 15, the armature 30 of the circuit changer 16 is drawn down into contact with said coils, causing a contact bar 31 mounted on the armature to contact with contact arms 32 and 33 respectively carried by said post 20 and by a similar post 34, the last mentioned post being connected by a wire 35 to a binding post 36 from which a wire 37 leads to a pair of magnet coils 38 in said tape perforator 23, which coils are connected by a wire 39 to a binding post 40 from which leads a wire 41 to line wire 2. Then, when the train passes to the rails *a* and *b*, an electrical circuit is completed through the front axle of the engine, said circuit including the battery 28, wires 29, 1 and 1ª, rail *a*, the axle of the engine, rail *b*, wires 2ª, 2, 41 and 39, magnet coils 38, wires 37 and 35, post 34, contact arm 33, contact bar 31, contact arm 32, wire 21, post 22, fixed member 24, armature 25 and wire 27.

The circuit through the magnet coils 38 being closed, as just described, the pivoted armature 42 thereof is drawn down into contact therewith. This action carries the front end of the small armature 25 downward, breaking the contact between the latter and the fixed member 24, thus deënergizing the coils 38 and at the same time making contact between said armature 25 and a fixed member 43 carried by a post 44, thus diverting the circuit from said armature 25 through a wire 45 to the small magnet coil 26, from which a wire 46 leads to the binding post 40. The circuit then comprises the battery 28, wires 29, 1 and 1ª, rail *a*, the axle of the engine, rail *b*, wires 2ª, 2, 41 and 46, coil 26, wire 45, post 44, fixed member 43, armature 25 and wire 27.

Fixed on the rear end of and in alinement with the armature 42 is a bar 47, to the rear end of which is pivotally attached the lower end of a substantially vertical punch or needle 48 which is adapted to operate vertically through the tape 6 and an outlet hole 49 in a cross-member 50 of a tape-guide 51 through which the tape 6 is passed as it is unwound from the reel 7, a guide-tube 52 being provided for directing said punch to said hole 49. When the circuit through the magnet coils 38 is completed and the pivoted armature 42 is drawn downward, the rear end of the latter is tipped up causing the needle 48 to perforate the tape. The location of the perforation in the tape produced by the passage of the needle therethrough will indicate the correct time of the entrance of the train upon the rails *a* and *b*. Said tape-guide 51 is mounted upon the top of a supporting-stand 53, as shown.

When a train traveling in the opposite direction—that is, from left to right along the track, passes upon the rails a and b, an electric circuit is completed by the current crossing from one of said rails to the other through the axle of the engine, said circuit comprising the battery 28, wire 27, a wire 54 tapped in to said wire 27, a pin 55 to which the said wire 54 leads and which is carried upon the rear end of the armature 25 and is insulated therefrom, as shown at 56, a contact post 57 with which said pin 55 normally stands in contact, a wire 58 leading from said post 57, a post 59 in said circuit changer 16 to which said wire 58 leads, a contact arm 60 carried by said post 59, the contact bar 31, a contact arm 61 (said contact bar 31 normally standing in contact with said arms 60 and 61), a post 62 on which said arm 61 is mounted, a wire 63 which leads from said post 62 to a second tape perforator 64, a small pivoted armature 65 to which said wire 63 leads, a fixed member 66 with which said armature 65 normally stands in contact, a post 67 upon which said fixed member is mounted, a wire 68 connected to post 67 and leading to a binding post 69, a wire 70 leading from said binding post, a pair of magnet coils 71 in said perforator 64, a wire 72 leading from said coils to a binding post 73, a wire 74 leading from said post 73 and tapped in to wire 41, said wire 41, wires 2 and 2ª, rail b, the engine axle, rail a, and wires 1ª, 1 and 29.

Upon the closing of the circuit just described, energizing the magnet coils 71, the pivoted armature 75 thereof is drawn down into contact therewith. This action thus tips the rear end of the armature 75 upward and causes a pivotally-attached needle 76 carried upon a bar on the rear end thereof to pass through the tape and an outlet hole 77 in the cross-member 50, said needle 76 being directed or guided by a guide-tube 78. When the armature 75 is drawn down, as above described, it carries therewith the front end of the small armature 65, breaking the contact between the latter and the fixed member 66, thus deënergizing the coils 71, and at the same time makes contact between said armature 65 and a fixed member 79 carried by a post 80, thus diverting the circuit from said armature 65 to a small magnet coil 81 through a wire 82, said coil 81 being connected by a wire 83 to the binding post 73.

It will be noted that when the tape has been perforated by the elevation of either of the needles 48 or 76 therethrough, as described, the electrical circuit through the magnet coil which effects the elevation of the needle is immediately diverted so as to deënergize said magnet coil, causing the needle to be immediately withdrawn from the tape.

A third tape perforator 84 may, if desired, be employed in conjunction with those hereinbefore described, said perforator being controlled by the movement of the operator's signal-operating lever and having for its object to record the time of the operator's displaying a white, or "clear track," signal at the station where the recording instrument is located. Said perforator is located in a normally open electric circuit which is closed by the movement of the signal-operating lever to a point which causes the signal to indicate a clear track. When the operating lever 85 is moved to such position, the electric circuit comprises a battery 86, a wire 87 leading from said battery to a contact post 88, said lever 85, a wire 89 connected at one end to said lever and at the other to a binding post 90, a wire 91, a pair of magnet coils 92, (said wire 91 connecting said post 90 and said coils) a wire 93 leading from said coils to a binding post 94, a wire 95 leading from said post 94, a post 96 to which said wire 95 leads, a fixed member 97 mounted upon said post 96, a small armature 98 the front end of which underlies and is normally in contact with said fixed member, and a wire 99 leading from said armature to the battery 86. The closing of said circuit energizes the magnet coils 92 and draws the pivoted armature 100 thereof downward, elevating the pivotally-mounted needle carried thereby (not shown) through the tape and an outlet hole 101 in the cross-member 50 of the tape-guide 51.

When the armature 100 is drawn down in the manner described, it carries therewith the front end of the small armature 98, breaking the contact between the latter and the fixed member 97, thus deënergizing the magnet coils 92, and at the same time makes contact between said armature 98 and a fixed member 102 carried by a post 103, and thus diverts the circuit from said armature 98 to a small magnet coil 104 through a wire 105, said coil 104 being connected by a wire 106 to the binding post 90.

The circuits established through the magnet coils 26 and 81 of the perforators 23 and 64, respectively, are broken only when the train which effected the closing thereof passes from the rails which form parts of said circuits, while the circuit established through the magnet coil 104 of the perforator 84 is broken only when the operating lever 85 is moved to actuate the signal to move to danger position.

It will be seen that the perforating needles of the instruments 23, 64 and 84 respectively operate through guide-tubes 52, 78, and 107, and that the perforations produced by the needles of the perforators 23 and 84 will appear on opposite sides of the tape, while the perforations produced by the needle of the perforator 64 will appear centrally of said tape. Consequently, the location of any particular perforation in the tape indicates the instrument or perforator which operated to produce the perforation, and, therefore, indicates whether it resulted from the passage of a train by one of the blocks A, B, C, D, E, or F, in a right or left direction, or from the operation of the operator's train signal to "clear track" position.

From the foregoing it will be clear that when an operator located at a recording station, as, for instance, station B, is apprised in the usual way by the operator at station A of the passage in his direction of a train, he will be kept accurately advised of the arrival and departure of such train at the intermediate non-recording stations and the time thereof, which time he preferably records on the ordinary train-sheet. Knowing the time schedule of the different trains and the length of time usually required for any particular train to pass from one station to another, the operator will have but little difficulty in following the trains and in determining which of a number of trains traveling between the recording stations A and B operated to produce any particular perforation of the tape.

I have shown in the drawings and up to this point have described the system only so far as it applies to the recording of the arrival of trains at the various stations. It will be readily perceived, however, that provision may be made for recording both the arrival and departure of trains by providing the wiring connections 1ª, 1ᵇ, 2ª and 3ª on each side of each station at a suitable distance apart—that is, at both approaches to each station.

Having thus described my invention, what I claim as new, and desire to secure by Letters Patent, is—

1. A train recording apparatus, comprising in combination, means for continuously moving a record strip, means for marking said strip for trains proceeding in one direction, means for marking said strips for trains proceeding in an opposite direction, both of said means being in circuit and means for changing the circuit for oppositely proceeding trains, said circuits being adapted to be closed to operate said marking means by the passage of a train.

2. A train recording apparatus, comprising in combination, means for progressing a record strip, means for marking said strip for trains proceeding in one direction, means in circuit with said first means for marking trains proceeding in an opposite direction, means for changing the circuit for oppositely proceeding trains, and means for regularly progressing said record strip.

3. A train recording apparatus, comprising in combination, means for regularly progressing a record strip, a plurality of recording means, means in circuit with said recording means for changing the circuit thereof according to the direction of travel of the actuating train for said recording means, and contact sections along the railroad track for the completion of a circuit by a passing train.

4. A train recording system comprising, in combination with a track-way, a plurality of line wires, registering apparatuses in circuit with said line wires and spaced at determined points, contact track-sections formed at intermediate and far points also in circuit with said line wires and adapted to complete the circuits by the passage of a train, and train controlled means for changing the circuit for oppositely proceeding trains.

5. A train recording system comprising, in combination with a track-way, a plurality of line wires, recording apparatuses in circuit with said line wires and spaced at determined points, and contact track-sections formed at intermediate and far points also in circuit with said line wires and adapted to automatically complete the circuits by the passage of a train, and automatic means for changing the circuit for oppositely proceeding trains.

6. A train recording system comprising in combination with a track-way, a plurality of line wires, recording apparatuses in circuit with said line wires and spaced at determined points, and contact track-sections formed at intermediate and far points also in circuit with said line wires and adapted to complete the circuits by the passage of a train, said recording apparatuses being adapted to record determinedly and distinguishably trains proceeding in both directions.

7. A train recording system comprising, in combination, a recording station provided with a recording apparatus, line wires passing therethrough in circuit with said recording apparatus, and other stations located along a track-way and having track sections also in circuit with said line wires and recording apparatus, said track sections being adapted to complete said circuit at the passage of a train to record the same, and means whereby said recording apparatus is automatically actuated to distinguishably record the time and direction of a train's passage.

8. A train recording apparatus comprising in combination, means for imparting to a record strip a regular chronometric progression, a marking device for recording on said strip the passage of a train, a similar device for marking on said strip the passage of an oppositely proceeding train, and a device in circuit with both of said marking devices for automatically changing the circuit to operate either device by the passage of trains.

9. A train recording apparatus comprising in combination, means for imparting to a record strip a regular chronometric progression, means for marking said strip at the passage of a train, means for distinguishably marking said strip at the passage of a train in an opposite direction, a circuit changer in circuit with both of said marking means whereby one or the other of said marking means is actuated to operate, according to the direction of a passing train, and means for marking said strip at the giving of a local signal.

10. A train recording apparatus, comprising in combination, means for chronometrically progressing a record strip, means for marking said strip at the passage of a train, means for marking said strip distinguishably from said first mark for the passage of a train in the opposite direction, and means for making a third mark to record the showing of a local signal.

11. A train recording apparatus comprising in combination, means for chronometrically progressing a record strip, means for marking said strip at the passage of a train, means for marking said strip distinguishably from said first mark for the passage of a train in the opposite direction, said means for marking trains being in circuit and having means for regulating said circuit automatically to operate either marking means, and means for making a third mark to record with the showing of a local signal.

12. A train recording apparatus, comprising in combination, a perforator plate, chronometric means for conveying a recording strip through said perforator plate, an electromagnetic perforator adjacent said plate and placed in a line circuit, a second perforator adjacent said plate and also in said circuit, and an electromagnetic circuit changer in said circuit to cause either of said perforators to operate with the passage of trains in either direction.

13. A train recording apparatus, comprising in combination, a perforator plate, chronometric means for passing a record strip through said perforator-plate, a plurality of electro-magnetic perforators placed adjacent said strip to operate through said plate to perforate said strip, and electromagnetic means in circuit with said perforators to regulate the circuit to operate either of said perforators for trains passing in one or the opposite direction, said perforators comprising electro-magnetic coils, an armature controlled by said coils and having a perforating needle thereon, and a secondary coil adapted to be thrown into circuit with the main coils to deënergize the same.

In testimony whereof I affix my signature in presence of two subscribing witnesses.

FRANKLIN A. PIERCE.

Witnesses:
H. E. DUNLAP,
E. A. LENKARD.